US012650892B2

(12) United States Patent
Arya et al.

(10) Patent No.: US 12,650,892 B2
(45) Date of Patent: Jun. 9, 2026

(54) METHOD AND APPARATUS FOR GENERATING AN ERROR OUT (EOUT) SIGNAL INDICATING A STATE OF A VIRTUAL ELECTRONIC CONTROL UNIT (vECU)

(71) Applicant: NXP B.V., Eindhoven (NL)

(72) Inventors: Sandeep Kumar Arya, Bangalore (IN); Hemant Nautiyal, Greater Noida (IN); Aastha Shukla, Noida (IN); Geeta Ahuja, Hisar (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/815,267

(22) Filed: Sep. 16, 2024

(65) Prior Publication Data

US 2026/0010424 A1    Jan. 8, 2026

(30) Foreign Application Priority Data

Jul. 4, 2024    (IN) .............................. 202441051317

(51) Int. Cl.
*G06F 11/00* (2006.01)
*G06F 11/07* (2006.01)

(52) U.S. Cl.
CPC ...... *G06F 11/0775* (2013.01); *G06F 11/0724* (2013.01); *G06F 11/0739* (2013.01)

(58) Field of Classification Search
CPC ............. G06F 11/0775; G06F 11/0724; G06F 11/0739; G06F 11/0772; G06F 11/3024; G06F 11/3013
See application file for complete search history.

(56) References Cited

U.S. PATENT DOCUMENTS

| | | | |
|---|---|---|---|
| 8,452,465 B1* | 5/2013 | Sinha .................... | G06F 11/143 365/189.08 |
| 11,334,409 B2 | 5/2022 | Nautiyal et al. | |
| 2020/0167223 A1 | 5/2020 | Cho | |
| 2021/0397502 A1* | 12/2021 | Nautiyal ............. | G06F 11/0793 |
| 2022/0138038 A1 | 5/2022 | Liang et al. | |
| 2022/0229486 A1 | 7/2022 | Ivanchenko et al. | |
| 2022/0392280 A1 | 12/2022 | Wei et al. | |
| 2024/0053808 A1 | 2/2024 | El Sherif et al. | |

(Continued)

FOREIGN PATENT DOCUMENTS

| | | |
|---|---|---|
| CN | 109484474 A | 3/2019 |

OTHER PUBLICATIONS

Urbina et al., "Multi-Core Architecture for AUTOSAR based on Virtual Electronic Control Units", 2015, IEEE (Year: 2015).*

*Primary Examiner* — Joseph D Manoskey

(57) ABSTRACT

An error out (EOUT) controller of a system on a chip (SoC) for fault management generates a first EOUT signal which indicates a virtual electronic control unit (vECU) of the SoC comprising a plurality of vECU is in a first state. The first EOUT signal is output, where the first EOUT signal is toggled at a first toggle frequency. A fault signal which indicates the vECU having a fault is received. Based on receiving the fault signal, an EOUT circuit is selected from a plurality of EOUT circuits and the selected EOUT circuit generates a second EOUT signal which indicates the vECU is in a second state. The second EOUT signal is then output, where the second EOUT signal is a toggled at a second toggle frequency or is a static signal.

18 Claims, 7 Drawing Sheets

(56) References Cited

U.S. PATENT DOCUMENTS

| | | | |
|---|---|---|---|
| 2024/0106677 A1* | 3/2024 | Hirano | H04L 12/40 |
| 2024/0134730 A1* | 4/2024 | Aneja | G06F 11/0772 |
| 2025/0013588 A1* | 1/2025 | Yang | G06F 13/20 |
| 2025/0140042 A1* | 5/2025 | Scibetta | B60R 16/0232 |
| 2025/0217229 A1* | 7/2025 | Baca | G06F 11/0793 |

* cited by examiner

CONFIG REGISTER DESCRIPTION

| BITS | 31 | 30 | 29 | 28 | 27 | 26 | 25 | 24 | 23 | 22 | 21 | 20 | 19 | 18 | 17 | 16 |
|------|----|----|----|----|----|----|----|----|----|----|----|----|----|----|----|----|
| R | SHIFT_DIR | | | | TSM_CNT | | | | | | | | | | | |
| W | | | | | | | | | | | | | | | | |
| RESET | 0 | 0 | 0 | 0 | 0 | 0 | 0 | 0 | 0 | 0 | 0 | 0 | 0 | 0 | 0 | 0 |

| BITS | 15 | 14 | 13 | 12 | 11 | 10 | 9 | 8 | 7 | 6 | 5 | 4 | 3 | 2 | 1 | 0 |
|------|----|----|----|----|----|----|---|---|---|---|---|---|---|---|---|---|
| R | TSM_CNT | | | | | | | | PRE-SCALER | | | FLT_SWITCH_EN | INV | EOUTM | | |
| W | | | | | | | | | | | | | | | | |
| RESET | 0 | 0 | 0 | 0 | 0 | 0 | 0 | 0 | 0 | 0 | 0 | 0 | 0 | 0 | 0 | 0 |

306
308
310
312
314
316
318
320

304

| FIELD | FUNCTION |
|---|---|
| 31<br>SHIFT_DIR | SHIFT DIRECTION<br>TO DEFINE THE SHIFT LEFT OR SHIFT RIGHT<br>0 - LEFT SHIFT<br>1 - RIGHT SHIFT |
| 30-28<br>... | RESERVED |
| 27-8<br>TSM_CNT | TIME SWITCH MODE COUNTER<br>THIS FIELD IS USED TO GENERATE EOUT TOGGLING IN TIME SWITCH MODE ONLY. IT REPRESENTS THE TIME THAT EOUT PIN<br>WILL TAKE TO TOGGLE FROM 0 TO 1 AND FROM 1 TO 0 WHEN NO FAULT CONDITION IS PRESENT.<br>THIS VALUE REPRESENTS HALF PERIOD DURATION IN TERMS OF VFCCU CLOCK CYCLES AT WHICH EOUT WILL TOGGLE.<br>EOUTfreq = VFCCU Clk freq/(2*TSM_CNT)<br>0000_0000_0000_0000b - RESERVED<br>0000_0000_0000_0001b - 1 VFCCU CLOCK CYCLE<br>0000_0000_0000_0010b - 1 VFCCU CLOCK CYCLE<br>0000_0000_0000_0011b - 1 VFCCU CLOCK CYCLE<br><br>1111_1111_1111_1111b - 1048575 VFCCU CLOCK CYCLE |
| 7<br>. | RESERVED |
| 6-5<br>PRE_SCALER | PRE-SCALER VALUE<br>TO DEFINE THE PRE SCALER VALUE WITH WHICH USER WANTS TO CHANGE THE FAULT FREQUENCY. |
| 4<br>FLT_SWITCH_EN | FAULT SWITCH ENABLE.<br>THIS FIELD IS USED TO DEFINE WHETHER USER WANTS TO DRIVE A STATIC VALUE OR A DIFFERENT FREQUENCY AT THE<br>TIME OF FAULT STATE.<br>0 - STATIC VALUE AT THE FAULT STATE<br>1 - FREQUENCY 2 (FAULT FREQUENCY) AT THE FAULT_STATE |
| 3<br>INV | INVERT EOUT<br>INVERTS THE EOUT SIGNALING FOR THE PUSH-PULL, OPEN-DRAIN, OPEN-COLLECTOR, TIME SWITCH, AND BI-STABLE OPERATING<br>MODES.<br>0b - NOT INVERTED<br>1b - INVERTED |
| 2-0<br>EOUTM | EOUT PIN MODE<br>SPECIFIES THE EOUT PIN OPERATING MODE. |

FIG. 3B

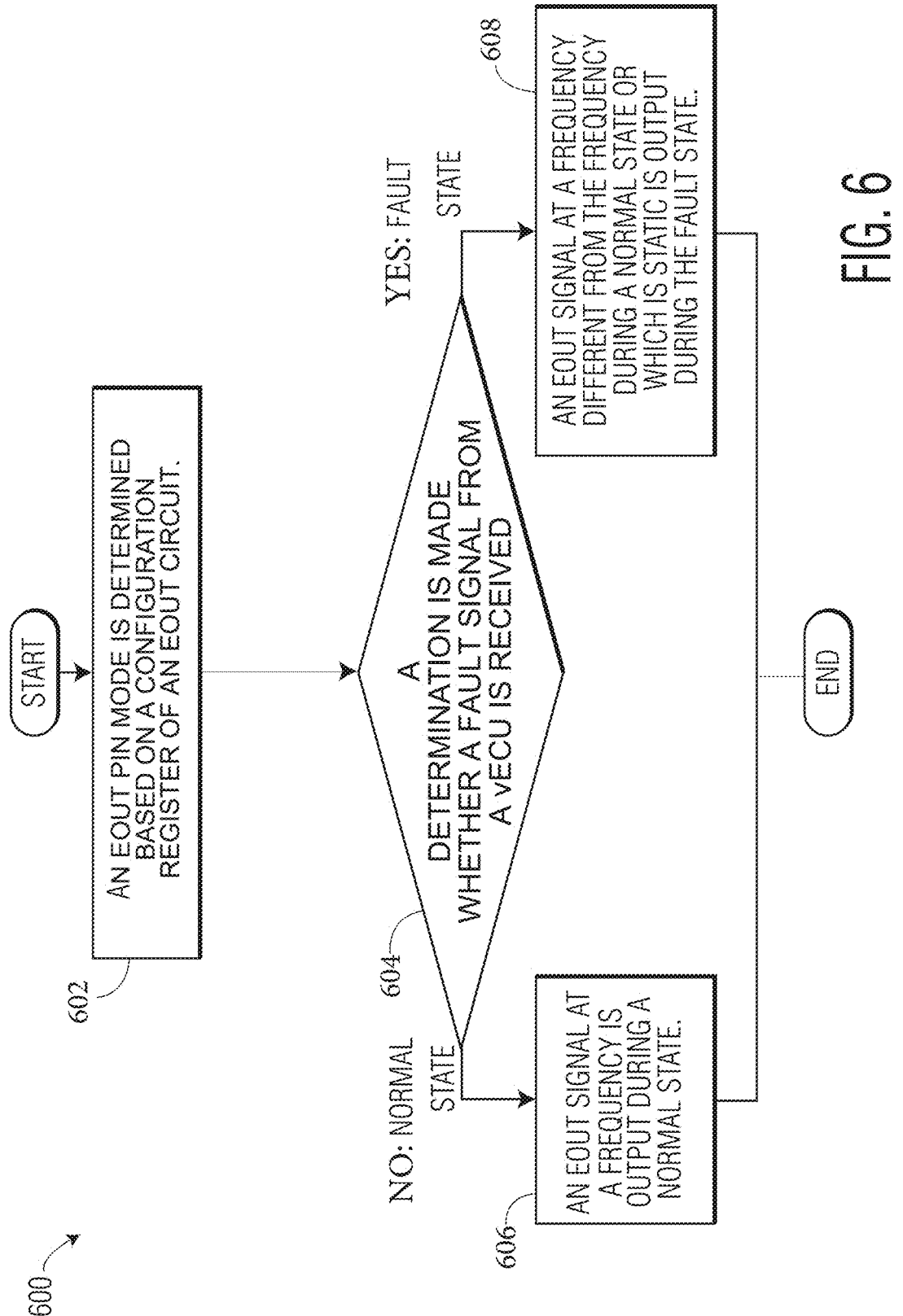

START

602

AN EOUT PIN MODE IS DETERMINED BASED ON A CONFIGURATION REGISTER OF AN EOUT CIRCUIT.

604

A DETERMINATION IS MADE WHETHER A FAULT SIGNAL FROM A VECU IS RECEIVED

NO: NORMAL STATE

YES: FAULT STATE

606

AN EOUT SIGNAL AT A FREQUENCY IS OUTPUT DURING A NORMAL STATE.

608

AN EOUT SIGNAL AT A FREQUENCY DIFFERENT FROM THE FREQUENCY DURING A NORMAL STATE OR WHICH IS STATIC IS OUTPUT DURING THE FAULT STATE.

END

METHOD AND APPARATUS FOR GENERATING AN ERROR OUT (EOUT) SIGNAL INDICATING A STATE OF A VIRTUAL ELECTRONIC CONTROL UNIT (vECU)

CROSS-REFERENCE TO RELATED APPLICATIONS

This application claims the priority under 35 U.S.C. § 119 of India Patent application no. 202441051317, filed on 4 Jul. 2024, the contents of which are incorporated by reference herein.

FIELD OF USE

This disclosure generally relates to fault management, and more particularly to generating an error out (EOUT) signal indicating a state of a virtual electronic control unit (vECU) which manages functions of a system such as a vehicle.

BACKGROUND

Electronic control units (ECUs) are positioned in a vehicle to manage various functions such as vehicle dynamics, body control, or advanced driver assist functions. A function is also referred to as a domain. Further, the vehicle has a central computer to perform operations based on outputs of the ECUs and zonal gateway modules to manage network traffic to the different ECUs. ECUs are now being implemented as software applications on a system on a chip (SoC), referred as virtual ECUs (vECUs) which execute independently on the SoC instead of being separate hardware components in the vehicle.

BRIEF DESCRIPTION OF THE DRAWINGS

FIGS. 3A & 3B illustrate an example configuration register of the EOUT controller and description of fields of the configuration register in accordance with an embodiment.

FIG. 6 is a flow chart of functions associated with providing an EOUT signal in accordance with an embodiment.

Figure 1:
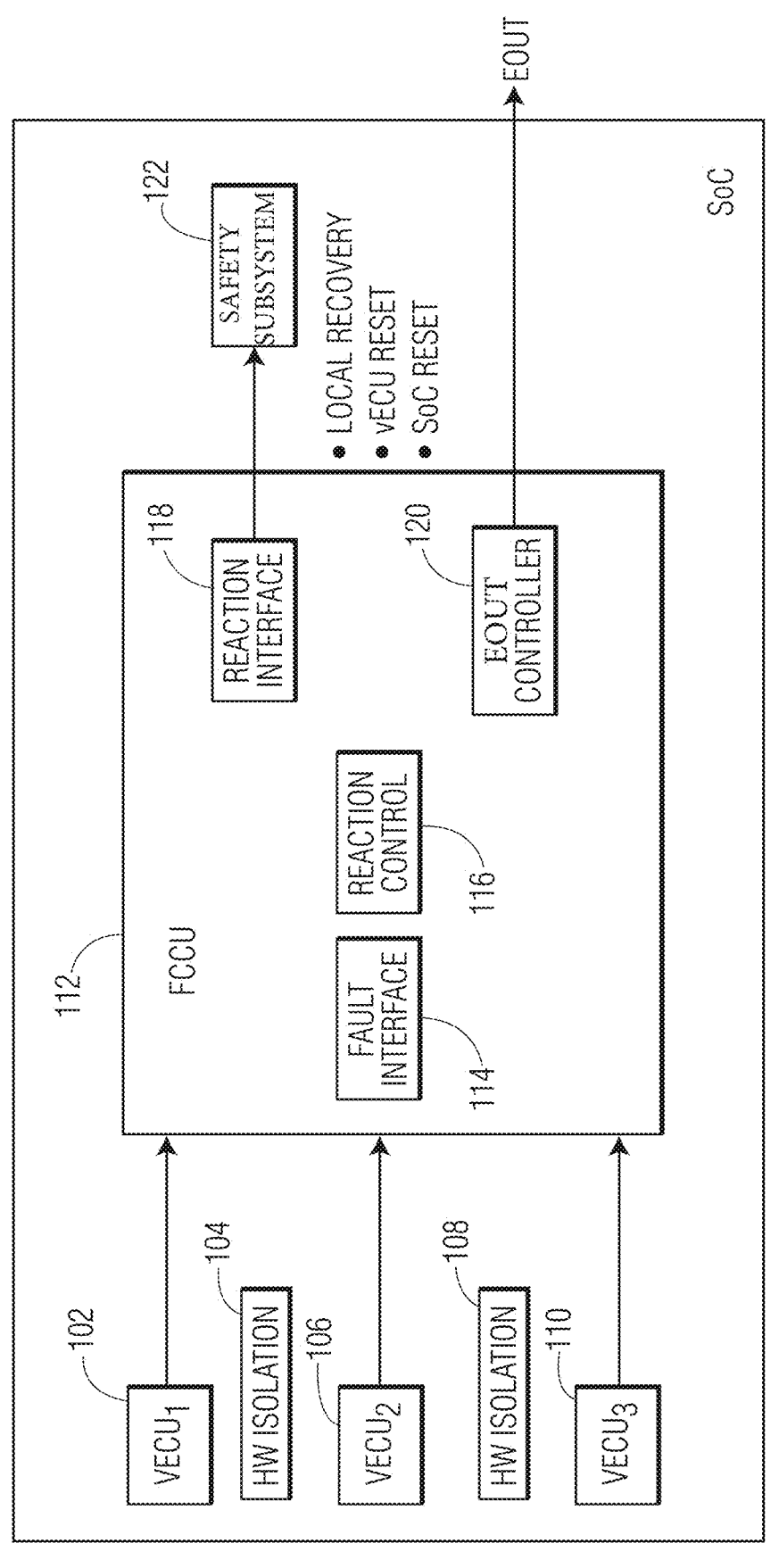
FIG. 1 illustrates an example block diagram of a system to indicate that a virtual electronic control unit (vECU) is in a safe state or normal state in accordance with an embodiment.

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Under some conditions, a virtual ECU (vECU) could have a fault. Fault recovery needs to be performed so that operation of the other vECUs in the SoC are not affected while providing an indication that the vECU is in a safe state during the fault recovery where the vECU is maintained in a known and defined state such as a reset or deactivation during the safe state.

Embodiments disclosed herein are directed to fault management of a virtual electronic control unit (vECU) running on a system on a chip (SoC). To facilitate different handling requirements, the SoC has a fault collection and control unit (FCCU) which outputs an error out (EOUT) signal indicative of whether the vECU is in a normal state and does not have a fault or has a fault and is in a safe state to a power management integrated circuit (PMIC) or external device. The FCCU has an EOUT circuit for each vECU to control output of the EOUT signal of a vECU to a respective external device or PMIC and the EOUT signal is arranged on one or more EOUT pins as a toggled signal or static signal. The signal is toggled at a frequency to indicate the vECU is in the normal state and toggled at a different frequency or is static to indicate that the vECU is in the safe state. A predefined frequency of the toggled signal depends on a bandwidth of an interface of the external device or PMIC which receives the indication and different EOUT circuits and associated EOUT pins may support different EOUT frequencies. Further, the toggled signal allows for detecting stuck-at-fault of an EOUT pin and avoids need for a redundant pin to detect the stuck-at-fault. Well known instructions, protocols, structures, and techniques have not been shown in detail in order not to obfuscate the description.

FIG. 1 illustrates an example block diagram of a system to indicate that a virtual electronic control unit (vECU) is in a safe state or normal state in accordance with an embodiment. The system may be embedded in an electronic system (not shown) such as an automotive system, an aircraft guidance system, a home security system, among other systems and implemented with circuitry such as one or more of analog circuitry, mix signal circuitry, memory circuitry, logic circuitry, and processing circuitry that executes code stored in a memory that when executed by the processing circuitry performs the disclosed functions, among other implementations, on a system on a chip (SoC).

The system includes an SoC 100 for operating hardware such as a plurality of sensors or actuators (not shown). In an example, sensors or actuators may facilitate performing vehicle dynamic functions such as car braking, steering, suspension, or transmission. In another example, sensors or actuators may facilitate performing compute intensive application functions for advanced driver assistance systems (ADAS). In yet another example, sensors or actuators may facilitate performing body control functions. In another example, sensors may facilitate performing a sensor fusion function for signals from multiple sensors. The SoC 100 may have a plurality of virtual electronic control units (vECU), shown as vECU 102, 106, 110 in an example, to manage respective sensors or actuators of a function, also referred to as a domain. The SoC 100 may have more or less vECUs than as illustrated. The vECU may be a software application running on the SoC 100 which is isolated in hardware and in software from other instances of vECUs running on the SoC 100. Hardware isolation may include use of hardware 104, 108 such as fence and drain to isolate execution of different processes while software isolation may include use of access restrictions between different processes. For example, hardware isolation 104 and hardware isolation 108 may isolate functions of vECU 102, 104, 110 from each other (e.g., the hardware isolation isolates vECU 102 from vECU 104 and vECU 110 etc.). In an example, the isolation may meet relevant automotive safety integrity level (ASIL) requirements. Further, the SoC 100 may have a fault collection and control unit (FCCU) 112 to perform fault handling. A fault interface 114 of the FCCU receives an indication of a fault in the vECU and a reaction control unit 116 determines a fault recovery to the fault such as a local reaction to the fault, a vECU reset, or an SoC reset. The fault may be a failure of hardware such as a random fault (e.g., stuck at or transient fault) or a failure of software such as a transaction or operation of the vECU in an example. The fault indication may include information about the fault such as a type of fault, a time when the fault occurred, and other parameters to characterize or reproduce the fault. Based on the determined fault recovery, a reaction interface 118 signals the safety subsystem 122 to perform the fault recovery (e.g., local reaction, vECU reset, or SoC reset). The safety subsystem 122 may execute safety recovery operations and include associated cores running the safety recovery applications and reset generation logic. Based on the signal from the reaction interface 118, the safety subsystem 122 may cause the reaction to be performed to recover from the fault including the local reaction in the vECU to remedy the fault, the reset of the vECU, or the reset of the SoC 100 depending on a nature of the fault. The signal from the reaction interface 118 may be an interrupt signal to a respective core running safety recovery applications or a reset generation signal to the reset generation logic which provides appropriate signals to reset the vECU with the fault or reset of the SoC 100. In an example, the local reaction may include shutting down an application of the vECU associated with the fault. The vECU may be in a safe state where the application associated with the fault is not being run by the vECU. In an example, the vECU reset may be a reset of the software and/or hardware of the vECU and any software or hardware resources of the vECU in the SoC 100. The vECU may be in a safe state where no applications are being run by the vECU. In an example, the SoC reset may be a power on reset of the software and/or hardware of the SoC 100 and any software or hardware resources of the SoC 100. The SoC 100 may be in a safe state where no applications are being run by the SoC 100.

Embodiments disclosed herein are directed to an error out (EOUT) controller 120 in the SoC 100 defining an EOUT signal for a vECU of the plurality of vECUs to indicate whether a fault recovery is ongoing for a vECU and the vECU is in the safe state during the recovery or the vECU is in a normal state and has no fault. The fault recovery may be one of a local recovery of the vECU to the fault, a reset of the vECU when the local recovery fails, or reset of the SoC when the vECU reset fails. The EOUT controller 120 may assert the EOUT signal for a vECU to a respective power management control unit (PMIC) or external device to indicate that the vECU is in a safe state during the fault recovery. In the safe state, the vECU is maintained in a known and defined state such as a reset or deactivation of an application running on the vECU causing the fault, the vECU is being reset or the SoC is being reset. Further, the vECU or SoC may be in the normal state after the reset is complete. The assertion of the EOUT signal causes the PMIC or external device to perform a function such as providing a visual indication of the fault on a display when the SoC 100 is in a vehicle and while recovery is ongoing.

Additionally or alternatively, the external device may take safety measures to manage safe stating of other components associated with a domain which includes the failing vECU. When the reset is complete, the EOUT signal is not asserted. In an example, the EOUT signal is provided on one or more EOUT pins of the SoC 100 by the EOUT controller 120. The EOUT signal may be dynamic in nature where the EOUT signal is a toggle signal or a static signal which indicates whether the vECU is in the safe state. In an example, the EOUT signal on an EOUT pin may be asserted dynamically and alternate between a zero and one level at one toggle frequency when the vECU is in a safe state and another toggle frequency when the vECU is in a normal state and not asserted. As another example, the EOUT signal on an EOUT pin may be not asserted dynamically and alternate between a zero and one level at a toggle frequency when the vECU is in a normal state and be a static signal and asserted when the vECU is in a safe state. Further, the dynamic indication may allow for detecting stuck-at-fault on an EOUT pin which is also a possible fault condition. For example, if 0 level signal means fault and 1 level signal means normal state and if EOUT pin outputs a EOUT signal stuck at 1 then an external device or PMIC will not be aware of a hardware fault of the EOUT pin. It will be challenging for systems expecting EOUT failure to be detected at run time and will require a redundant pin. For SoCs especially limited in number of EOUT pins, toggling support will help identifying fault conditions of the EOUT pins during runtime. The stuck at fault may be detected as a variation in toggle frequency of an EOUT signal at the EOUT pin from a predefined frequency. Further, in some examples, each external device or PMIC may be arranged to receive an EOUT signal at a particular toggle frequency or as a static signal. The EOUT signal may be toggled at a particular toggle frequency to indicate the safe state of the vECU to an external device or PMIC which detects a toggle of the EOUT signal at the particular toggle frequency and determines that the vECU is in the safe state.

Figure 2:
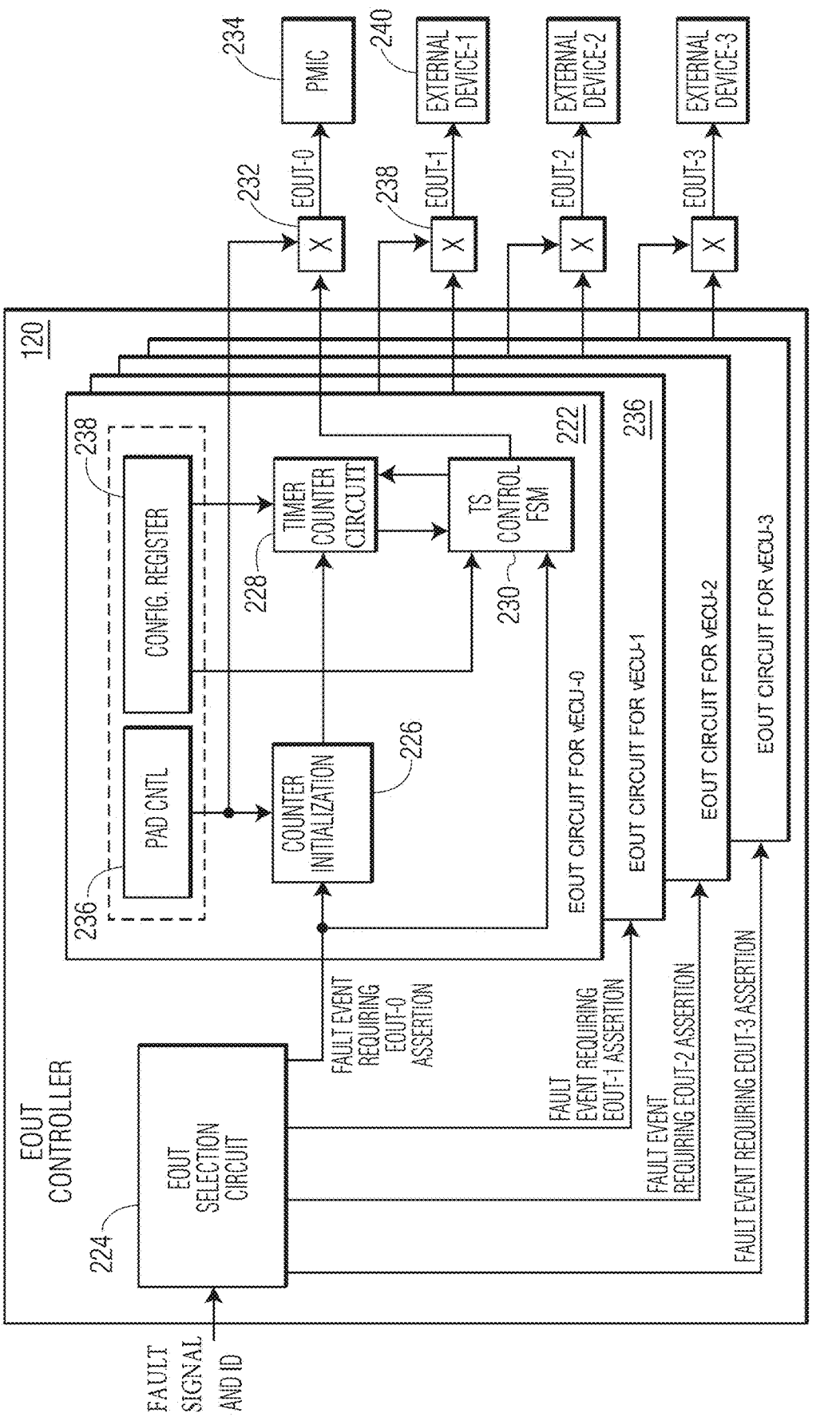
FIG. 2 is a detailed illustration of an error out (EOUT) controller in accordance with an embodiment.

FIG. 2 is a detailed illustration of the EOUT controller 120 in accordance with an embodiment. The EOUT controller 120 may include an EOUT selection circuit 224 and a plurality of EOUT circuits, examples of which are illustrated as EOUT circuits 222, 236. Each EOUT circuit may drive a safe state indication as an EOUT signal on a particular EOUT pin coupled to a respective external device or PMIC based on presence of a fault in a particular vECU or a normal state indication as an EOUT signal on a particular EOUT pin coupled to a respective external device or PMIC based on absence of a fault for a particular vECU. In an example, an EOUT circuit 222 may drive an EOUT0 pin 232 coupled to a PMIC 234 with an EOUT signal. As another example, an EOUT circuit 236 may drive an EOUT1 pin 238 coupled to an external device 240 with an EOUT.

The EOUT selection circuit 224 may receive a fault signal from an vECU and an identifier of the vECU having a fault. The fault signal may indicate that a fault is detected on a vECU. The vECU indicated by the identifier may have a fault which is a failure of a transaction or operation the vECU in an example. Based on the identifier and the fault signal, the EOUT selection circuit 224 may select an EOUT circuit associated with the vECU indicated by the identifier to output a corresponding EOUT signal indicating that the vECU has a fault and is in the safe state during the fault recovery. The fault signal may stop being received when the fault recovery is completed or when there is no fault on the vECU and the vECU is in a normal state indicating that no fault is present. Based on the fault signal not being received, the EOUT selection circuit 224 may output a corresponding EOUT signal indicating the vECU is in a normal state. The EOUT circuit which is selected for the vECU outputs an EOUT signal for the external device or PMIC coupled to the respective EOUT pin of the EOUT circuit.

Each EOUT circuit for a vECU, e.g., EOUT circuit 222, may include a counter initialization circuit 226, a timer counter circuit 228, and a time switch (TS) control finite state machine (FSM) 230 shown with respect to EOUT controller 222 to output a respective EOUT signal. Further, the EOUT controller 222 may include a pad control 236 and a configuration register 238 which is initialized during a configuration of the SoC 100. The configuration register 238 may indicate that the EOUT controller is in a particular time switch mode. In a first time switch mode, the EOUT signal may be de-asserted when toggled at a toggle frequency to indicate a normal state of the vECU0 when there is no fault in vECU0 and asserted by providing a static value when there is a fault in vECU0 and to indicate that a fault recovery is ongoing for a vECU0 and the vECU0 is in the safe state during the recovery. In a second time switch mode, the EOUT signal may be de-asserted when toggled at a first toggle frequency to indicate a normal state of the vECU0 when there is no fault in vECU0 and asserted when toggled at a second toggle frequency when there is a fault in vECU0 and to indicate that a fault recovery is ongoing for a vECU and the vECU is in the safe state during the recovery.

In an example, the pad control 236 may generate a trigger after a reset of the SoC 100 to provide an indication to enable a pin such as the EOUT0 pin 232. Further, the pad control 236 may indicate the reset of the SoC 100 to the counter initialization circuit 226 during an initialization of the SoC 100. The configuration register 238 may indicate a timer configuration which defines the toggle frequency of the EOUT signal. This configuration is indicated to the timer counter circuit 228 which arranges a counter to generate a toggle indication at a toggle frequency indicated by the configuration register 238. Based on the trigger from the pad control 236, the counter initialization logic 226 may trigger the timer counter logic 228 to start the counter and provide a toggle indication to the time switch control FSM 230 when the EOUT signal output to the EOUT pin 232 is to toggle from 0 to 1 or 1 to 0 and the time switch control FSM 230 outputs the EOUT signal which toggles based on the toggle indication to the EOUT pin. In some examples, whether the EOUT toggles from 1 to 0 or 0 to 1 after reset may also be indicated by the configuration register 238. Further, so long as no fault is indicated by the EOUT selection circuit 224, the counter initialization logic 226 may continue to provide a signal to reset the counter when the count expires so that the EOUT signal which toggles may continue to be generated and provided to the time switch control FSM 230. The time state control FSM 230 may output the EOUT signal which is a toggled signal at a toggle frequency corresponding to a normal state of the vECU0 which is provided to the EOUT pin 232.

When the fault signal is received for vECU0 at the EOUT selection circuit 224, the EOUT controller 120 may output an EOUT signal indicative of the vECU having a fault and being in a safe state. The EOUT selection circuit 224 may signal the time switch control FSM 230 to cause the timer counter circuit 228 to stop the counter. The EOUT selection circuit 224 may also signal the counter initialization logic 226 to cause the counter of the timer counter circuit 228 to be reset. In one example, the reset of the counter may cause the counter to output a toggle indication to the time switch control FSM 230 at another toggle frequency. The other toggle frequency may be indicated by the configuration register 238 and the time switch control FSM 230 may use the toggle indication over time to generate the EOUT signal at the other toggle frequency. In another example, the reset may cause the counter to stop counting and the time switch control FSM 230 may generate the EOUT signal which is a static 0 signal or static 1 signal. The static EOUT signal or EOUT at the other toggle frequency is output to the EOUT pin 232. The time switch control FSM 230 may continue to output the EOUT signal indicative of the vECU being in the safe state until the fault signal is no longer received at which point the EOUT signal output may indicate that the vECU is in the normal state. A similar operation is also performed for the other EOUT circuits during presence or absence of a fault of a respective vECU such as vECU1 or vECU2. Different EOUT circuits may generate EOUT signals with different or the same toggle frequencies depending on the configuration register settings and external device or PMIC which is to receive the EOUT signal to support fault management for each of the vECUs.

Figure 3A:
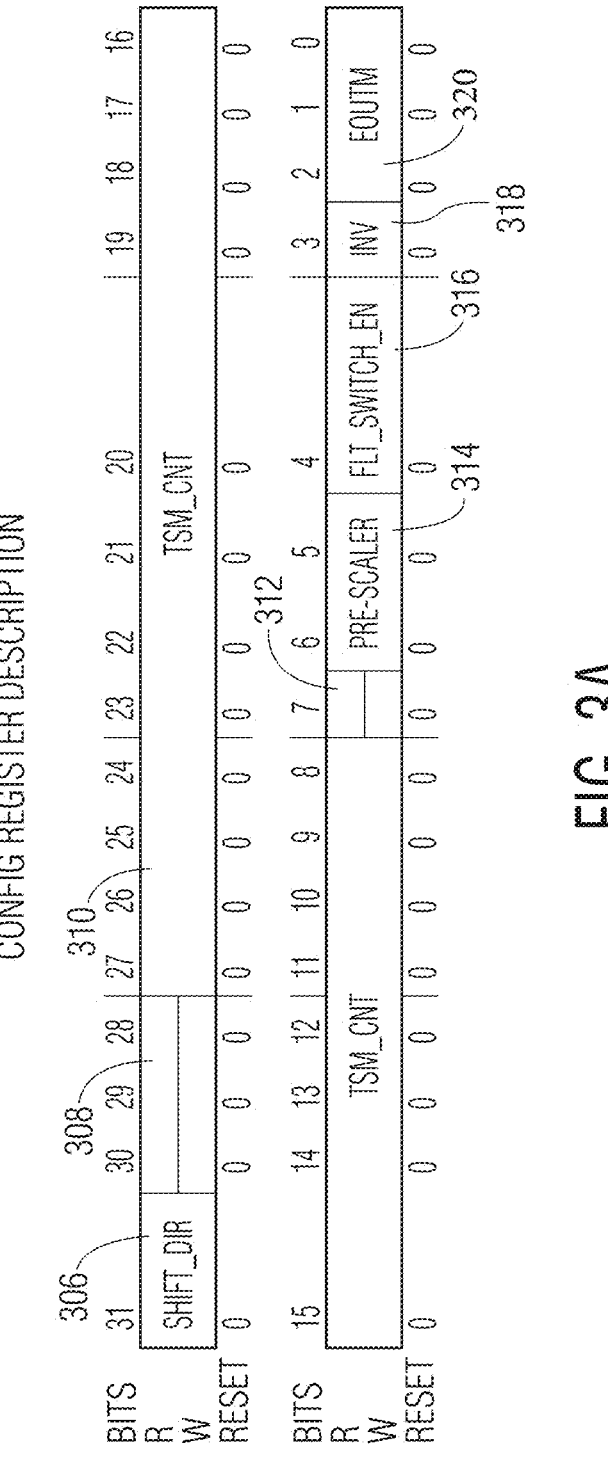

FIGS. 3A & 3B illustrate example fields of the configuration register 238 and description of the configuration register 238 in accordance with an embodiment. The timer counter logic 228 and time switch control FSM 230 of an EOUT circuit may have access to contents of the configuration register 238. A configuration register description may include a plurality bit fields 306-320 ranging from bits 31 to 0 described further by table 304. Bits 31 shown as field 306 may indicate a shift direction where 0 may be left shift and 1 may be a right shift which indicates a shift amount of a bit representation of a toggle frequency of the EOUT signal when the vECU has a fault. For example, the timer counter circuit 228 may shift the representation of the toggle frequency to adjust the toggle frequency of the EOUT signal by the shift direction to specify a toggle frequency of the EOUT signal when the vECU has a fault. Bits 30-28 shown as field 308 may be reserved followed by bits 27-8 shown as field 310 which indicates a time switch mode (TSM) count. The time switch mode count in bits 27-8 may be used by the timer counter logic 228 to indicate a time that the EOUT signal on the EOUT pin is to take to toggle from zero to one or one to zero when the vECU does not have a fault. A number of clock cycles of an FCCU clock is indicated to define an EOUT half period duration. Bit 7 shown as field 312 is reserved and bits 6 to 5 shown as field 314 indicates a pre-scaler value. The bit 4 shown as field 316 indicates a fault switch enable field which indicates whether the time switch FSM 230 is to drive a static value or toggle signal to indicate the EOUT signal when the vECU has a fault. For example, a setting of zero indicates to use a static value to indicate the vECU has a fault while a setting of one indicates to use a toggling of the EOUT at a toggle frequency to indicate the vECU has a fault. Alternatively, a setting of one indicates to use a static value to indicate the vECU has a fault while a setting of zero indicates to use a toggling of the EOUT at a toggle frequency to indicate the vECU has a fault. Bit 3 shown as inverter field 318 indicates whether the EOUT signal is to be inverted for push-pull, open drain, open collector, time switch, and bi-stable operating modes. The inverter field 318 may indicate a polarity of the EOUT signal after reset. For example, the inverter field 318 may indicate whether the EOUT toggles from 1 to 0 or 0 to 1 after reset. The bits 2-0 shown as field 320 indicate an EOUT pin mode. In an example, the EOUT pin mode may indicate whether the EOUT pin is to operate in accordance with a particular mode such as toggling in normal operation of the vECU and driving a static value when the vECU has a fault, referred to as the time switch mode or another mode such as the EOUT being a first static value when the vECU has a fault and another a static value in normal operation of the vECU. The EOUT pin defined by the EOUT pin mode may be also driven in other modes other thran the time switch modes such a bi-stable mode (normal state is indicated by one static signal and safe state is indicated by another static signal) or a tri-state mode where a state is indicated by a tri-state signal. Each EOUT circuit may have its own configuration register 238 configured in accordance with the vECU which is associated with the EOUT circuit.

Figure 4:
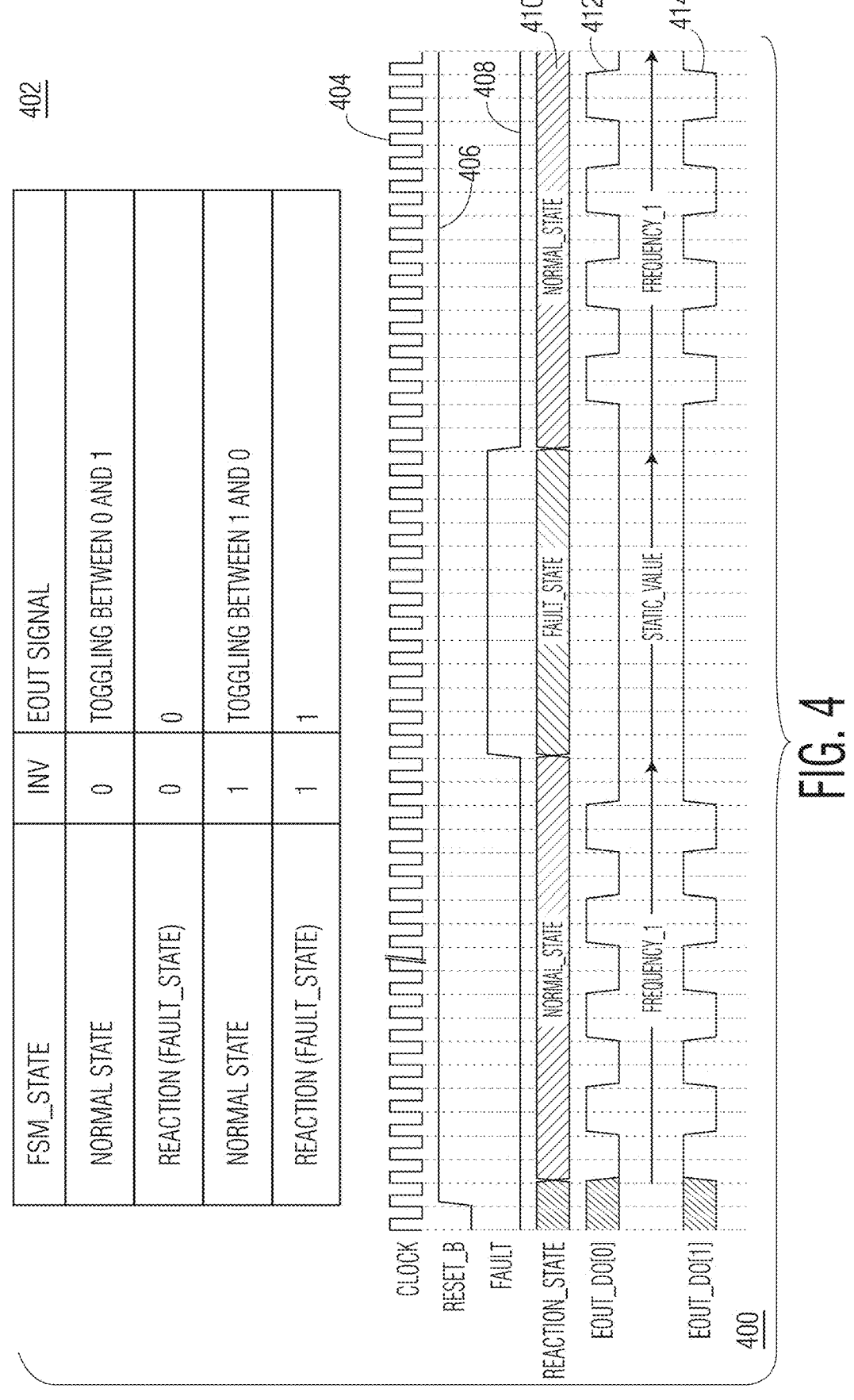
FIG. 4 illustrates example signals for the EOUT controller to generate an EOUT signal in accordance with an embodiment.

FIG. 4 illustrates example signals for the EOUT controller to generate an EOUT signal in accordance with an embodiment. In the example, the time state control FSM 130 may be configured to cause the EOUT signal to toggle at a toggle frequency in a normal state of the vECU and have a static value when vECU has a fault and is in a safe state based on the EOUT pin mode indicated in field 320 of the configuration register in this example. In an example, the EOUT half period duration which determines the toggle frequency during the normal state may be the FCCU clock cycle duration (full period)*TSM_COUNT value as defined by field 310.

A clock signal 404, a reset signal 406, a fault signal 408, a reaction state 410, and EOUT signal 412, 414 are shown as signals 400. The FCCU clock signal 404 may provide a timing for the EOUT controller 120 and the pad control 236 may output the reset signal 406 which indicates by an active low signal that the vECU is reset and by an active high that the reset is complete. The counter initialization logic 226 may use the reset signal to cause the timer counter circuit 228 to initialize the counter to generate the EOUT signal. The fault signal 408 may indicate to the EOUT selection circuit 224 whether the vECU has a fault. If the fault signal is not received (e.g., logic 0 or not asserted), then the vECU is in a normal state as shown by the reaction state 410 of the time switch control FSM 230 and the vECU is in a normal state while if the fault signal is received (e.g., logic 1 or asserted), then the vECU has a fault as shown by the fault state of the reaction state 410 in the time switch control FSM 230. An inverter value of field 218 of the configuration register 302 may be set to zero or one. If the inverter circuit is set to zero, then the EOUT signal may toggle between zero and one with a toggle frequency Frequency_1 when the vECU is in the normal state and static value of zero when the vECU has a fault as output by the time switch control FSM 230. If the inverter field is set to a one, then the EOUT signal toggles between one and zero at a toggle frequency Frequency_1 when the vECU is in the normal state and static value of one when the vECU has a fault as output by the time switch control FSM 230. In an example, the EOUT signal 412, 414 may be one of two signals, each which are an inverse to each other, one of which is output depending on the inverter value. For example, EOUT_DO(0) is output when the inverter value 318 is a 0 and EOUT_DO(1) is output when the inverter value 318 is a 1. The static value may be defined based on a setting of the inverter field 318 in an example. For example, if the inverter setting is 0, then the static value may be 0 while if the inverter setting is 1, then the static value may be 1. Further, the toggling frequency Frequency_1 may be based on the time switch mode count of the field 310 indicated by the configuration register 302. Table 402 summarizes the nature of the EOUT signal based on a reaction state of the time switch control FSM 230, the inverter value, and whether the EOUT signal is to toggle from 1 to 0 or 0 to 1 or be a static signal of 0 or 1.

Figure 5:
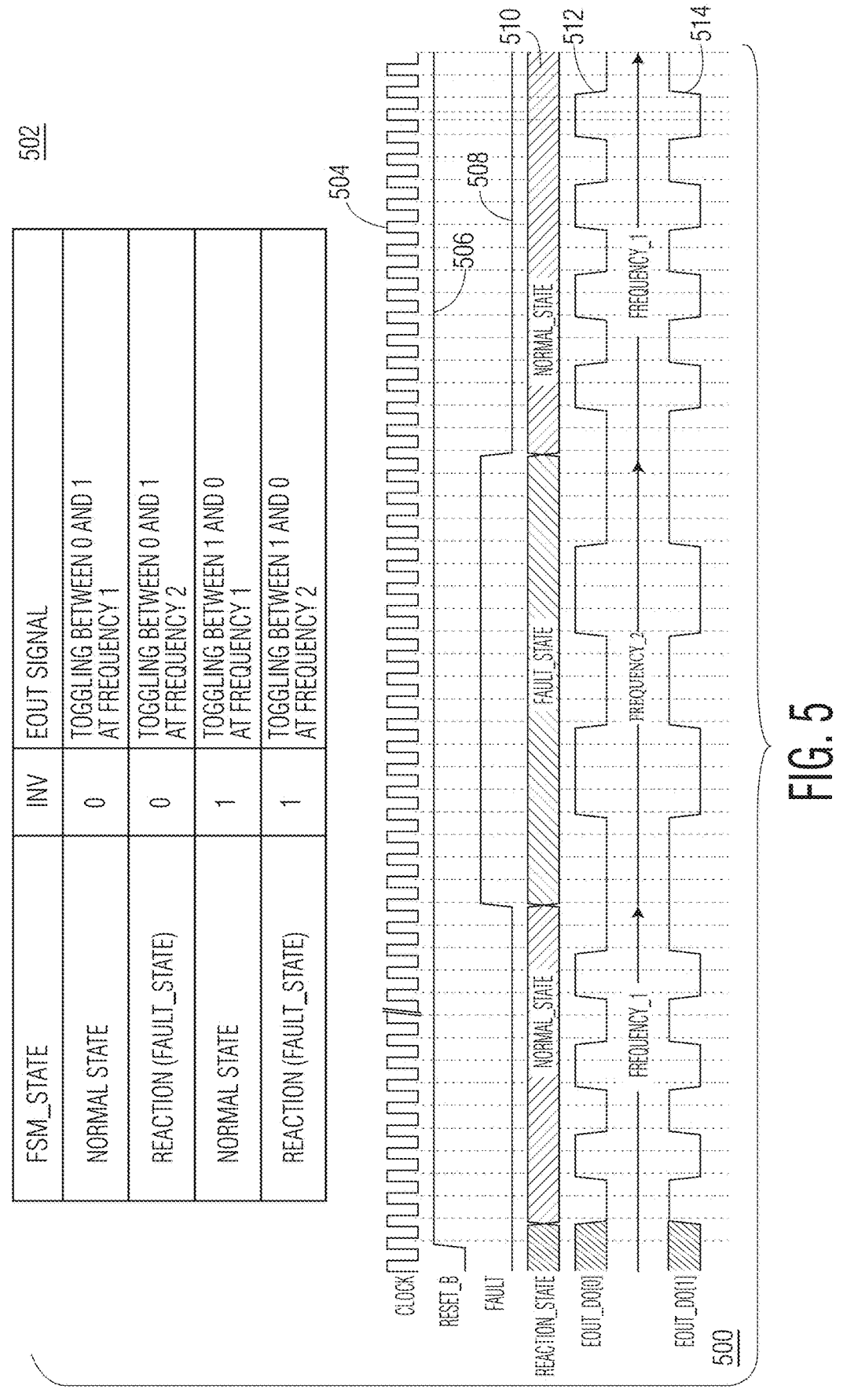
FIG. 5 example signals for the EOUT controller to generate another EOUT signal in accordance with an embodiment.

FIG. 5 illustrates example signals for the EOUT controller to generate another EOUT signal in accordance with an embodiment. In the example, the time state control FSM 230 may be configured to cause the EOUT signal to toggle at a first toggle frequency in a normal state of the vECU and toggle at a second toggle frequency when the vECU has a fault based on the EOUT pin mode indicated in field 320 of the configuration register 238 in this example. The EOUT half period duration during a fault state when EOUT is to toggle at the second toggle frequency and it is not selected to be static is based on the FCCU clock cycle duration (full period)*[TSM_COUNT value*PRE-SCALER value when SHIFT-DIR=0 or FCCU clock cycle duration (full period) *[TSM_COUNT value/PRE-SCALER value when SHIFT-DIR=1. Field 310 may define the TSM COUNT value, field 314 may define the PRE-SCALER value, and field 306 may define the SHIFT-DIR. The two variations in second toggle frequency is controlled by the SHIFT DIR. In first case, when SHIFT DIR=0, TSM_COUNT value is multiplied by PRESCALER to cause the second toggle frequency to be slower than the first toggle frequency while in the second case when SHIFT DIR=1, PRESCALER divides TSM_COUNT value to cause the second toggle frequency to be faster than the first toggle frequency.

A clock signal 504, a reset signal 506, a fault signal 508, a reaction state 510, and EOUT signal 512-514 are shown as signals 500. The clock signal 504 may provide a timing for the EOUT controller 120 and the pad control 236 may output the reset signal 506 which indicates by an active low signal that the vECU is reset and by an active high that the reset is complete. The counter initialization logic 226 may use the reset signal to cause the timer counter circuit 228 to initialize the counter to generate the EOUT signal. The fault signal 508 being received (e.g., logic 1) may indicate to the EOUT selection circuit 224 whether the vECU has a fault. If the fault signal is not received (e.g., logic 0), then the vECU is in a normal state as shown by the reaction state 510 of the time switch control FSM 230 and the vECU does not have a fault while if the fault signal is received (e.g., logic 1), then the vECU has a fault as shown by the reaction state 510 of the time switch control FSM 230. An inverter value of field 318 of the configuration register 302 may be set to zero or one. If the inverter value is set to a zero state, then the EOUT is de-asserted and toggles between zero and one at a first toggle frequency Frequency_1 when the vECU is in a normal state and is asserted and toggles between zero and one at a second toggle frequency Frequency_2 when the vECU has a fault as output by the time switch control FSM 230. If the inverter value is set to a one state, then the EOUT toggles between one and zero at a first toggle frequency Frequency_1 when the vECU is in the normal state and toggles between one and zero at a second toggle frequency Frequency_2 when the vECU has a fault as output by the time switch control FSM 230. If the inverter value is set to a zero state, then the EOUT 512, 514 toggles between zero and one at a first toggle frequency Frequency_1 when the vECU has a normal state and toggles between zero and one at a second toggle frequency Frequency_2 when the vECU has a fault. In an example, the EOUT signal 512, 514 may include two signals, each which are an inverse to each other, one of which is output depending on the inverter value. Table 502 summarizes the nature of the EOUT signal based on whether the vECU has a fault or is in a normal state, the inverter value, and in particular whether the EOUT signal is to toggle from 1 to 0 or 0 to 1 and the toggle frequency.

FIG. 6 is a flow chart 600 of functions associated with providing an EOUT signal in accordance with an embodiment. The functions may be performed by an EOUT controller and an EOUT circuit associated with a vECU in an example. At 602, an EOUT pin mode is determined based on a configuration register of an EOUT controller. The configuration register may indicate by a field in the configuration register how the EOUT pin is to indicate that a vECU is in the normal state or has a fault and is in a safe state. For example, the SoC may be configured in a time switch mode to indicate that the vECU is in a normal state by an EOUT signal that is toggled at a toggle frequency or has a fault and is in a safe state by a EOUT signal which is a static signal. As another example, SoC may be configured in a time switch mode to indicate that the vECU is in a normal state by an EOUT signal that is toggled at a first toggle frequency and has a fault and is in a safe state by an EOUT signal that is toggled at a second toggle frequency. At 604, a determination is made whether a fault signal from a vECU is received. The fault signal may be received when it is asserted. At 606, an EOUT signal at a toggle frequency is output during a normal state of a vECU. The configuration register may indicate the toggle frequency of the EOUT signal. The EOUT may not be a static signal in the normal state so that any stuck at fault is detected by failure of the EOUT signal to toggle. If a fault signal from the vECU is received at an EOUT circuit, at 608, an EOUT signal at a toggle frequency different from the toggle frequency when the vECU is in the normal state or which is static is output when the vECU has a fault. The EOUT signal may be defined by the EOUT pin mode in the configuration register. In one example, the EOUT signal may indicate the vECU is operating in a safe state when having a fault by a static signal. Whether the static signal is a 0 or a 1 may be based on an inverter field of the configuration register. In another example, the EOUT signal may indicate that the vECU operating in a safe state when having a fault by a EOUT signal which toggles at a toggle frequency, where the toggle frequency may be different than the toggle frequency of the EOUT signal when the vECU was in the normal state. Whether the toggle is 0 to 1 or 1 to 0 may be based on the inverter field of the configuration register. The EOUT signal may be provided to an external device or PMIC depending on the vECU. Further, based on the fault signal and indication of vECU having the fault, the disclosed EOUT controller selects an EOUT circuit associated with the vECU having the fault to output a respective EOUT signal. The EOUT controller enables support of multiple virtual ECU capabilities and EOUT time switch mode on per pin basis and external device or PMIC with flexibility to allow different frequency selection during the normal state and when the vECU has a fault.

In one embodiment, a method performed by an error out (EOUT) controller of a system on a chip (SoC) for fault management is disclosed. The method comprises: generating a first EOUT signal which indicates a virtual electronic control unit (vECU) of the SoC comprising a plurality of vECU is in a first state; outputting the first EOUT signal, wherein the first EOUT signal is toggled at a first toggle frequency; receiving a fault signal which indicates the vECU has a fault; based on receiving the fault signal, selecting an EOUT circuit from a plurality of EOUT circuits; generating, by the selected EOUT circuit, a second EOUT signal which indicates the vECU is in a second state; and outputting, by the selected EOUT circuit, the second EOUT signal, wherein the second EOUT signal is a toggled at a second toggle frequency or is a static signal. In an example, the first EOUT signal and second EOUT signal are output to a power management integrated circuit (PMIC) or external device. In an example, the method further comprises accessing a configuration register for an EOUT pin mode, based on the EOUT pin mode being a first value, the first EOUT signal is toggled at the first toggle frequency and the second EOUT signal is static and based on the EOUT mode indication being a second value, first EOUT signal is toggled at the first toggle frequency and the second EOUT signal is toggled at the second toggle frequency. In an example, the configuration register indicates that a bit representation of the second toggle frequency is a shifted version of a bit representation of the first toggle frequency. In an example, the indication of the fault signal is provided by the vECU and the toggle frequencies are defined by a configuration register corresponding to the vECU where different toggle frequencies are associated with different vECUs. In an example, the second EOUT signal indicates the vECU is in a safe state and the first EOUT signal indicates the vECU is in a normal state. In an example, in the safe state the vECU is not running one or more applications associated with the fault. In an example, the first EOUT signal and second EOUT signal is further based on an inverter value, wherein the first EOUT signal and second EOUT signal is inverted based on the inverter value. In an example, the method further comprises enabling an EOUT pin to output the first EOUT signal based on a reset of the vECU or the second EOUT signal.

In another embodiment, an error out (EOUT) controller on a system on a chip (SoC) associated with fault management is disclosed. The EOUT controller comprises: a plurality of EOUT circuits; a fault selection circuit arranged to receive a fault signal which indicates a virtual electronic control circuit (vECU) has a fault and based on the fault signal, select an EOUT circuit from a plurality of EOUT circuits based on the received fault signal; wherein the selected EOUT circuit is arranged to based on not receiving the fault signal, generate a first EOUT signal which indicates the vECU of the SoC comprising a plurality of vECU is a first state; based on receiving the fault signal, generate a second EOUT signal which indicates the vECU is a second state, wherein the first EOUT signal is toggled at a first toggle frequency and the second EOUT signal is a toggled at a second toggle frequency or is a static signal; and output the first EOUT signal or second EOUT signal. In an example, the first EOUT signal and second EOUT signal is output to a power management integrated circuit (PMIC) or external device. In an example, the EOUT circuit is further arranged to access a configuration register for a EOUT pin mode, based on the EOUT pin mode being a first value, the first EOUT signal is toggled at the first toggle frequency and the second EOUT signal is static and based on the EOUT mode indication being a second value, the first EOUT signal is toggled at the first toggle frequency and the second EOUT signal is toggled at the second toggle frequency. In an example, the configuration register indicates that the second toggle frequency is a scaled version of the first frequency. In an example, the indication of the fault is provided by the vECU. In an example, the second EOUT signal indicates the vECU is in a safe state and the first EOUT signal indicates the vECU is in a normal state. In an example, the indication of the fault signal is provided by the vECU and the toggle frequencies are defined by a configuration register corresponding to the vECU where different toggle frequencies are associated with different vECUs. In an example, the EOUT controller further comprises a configuration register with an inverter field, wherein contents indicate whether to invert the first and second EOUT signal. In an example, the EOUT controller further comprises a configuration register with an EOUT pin field, wherein the second EOUT signal is toggled at the second toggle frequency or is the static signal based on the EOUT pin field. In an example, the EOUT controller further comprises a configuration register with a time switch mode count field, wherein the first toggle frequency or second toggle frequency is based on a time switch mode count of the time switch mode count field. In an example, the EOUT controller of claim 10 further comprises an EOUT pin which is enabled to output the first EOUT signal based on a reset of the vECU or the second EOUT signal.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method performed by an error out (EOUT) controller of a system on a chip (SoC) for fault management, the method comprising:
   generating a first EOUT signal which indicates a virtual electronic control unit (vECU) of the SoC comprising a plurality of vECU is in a first state;

outputting the first EOUT signal, wherein the first EOUT signal is toggled at a first toggle frequency;
   receiving a fault signal which indicates the vECU has a fault;
   based on receiving the fault signal, selecting an EOUT circuit from a plurality of EOUT circuits;
   generating, by the selected EOUT circuit, a second EOUT signal which indicates the vECU is in a second state; and
   outputting, by the selected EOUT circuit, the second EOUT signal, wherein the second EOUT signal is a toggled at a second toggle frequency or is a static signal; and
   wherein a configuration register for an EOUT pin mode is accessed, based on the EOUT pin mode being a first value, the first EOUT signal is toggled at the first toggle frequency and the second EOUT signal is static and based on an EOUT mode indication being a second value, first EOUT signal is toggled at the first toggle frequency and the second EOUT signal is toggled at the second toggle frequency.

2. The method of claim 1, wherein the first EOUT signal and second EOUT signal are output to a power management integrated circuit (PMIC) or external device.

3. The method of claim 1, wherein the configuration register indicates that a bit representation of the second toggle frequency is a shifted version of a bit representation of the first toggle frequency.

4. The method of claim 1, wherein the indication of the fault signal is provided by the vECU and the toggle frequencies are defined by the configuration register corresponding to the vECU where different toggle frequencies are associated with different vECUs.

5. The method of claim 1, wherein the second EOUT signal indicates the vECU is in a safe state and the first EOUT signal indicates the vECU is in a normal state.

6. The method of claim 1, wherein in a safe state the vECU is not running one or more applications associated with the fault.

7. The method of claim 1, wherein the first EOUT signal and second EOUT signal is further based on an inverter value, wherein the first EOUT signal and second EOUT signal is inverted based on the inverter value.

8. The method of claim 1, further comprising enabling an EOUT pin to output the first EOUT signal based on a reset of the vECU or second EOUT signal.

9. An error out (EOUT) controller on a system on a chip (SoC) associated with fault management, the EOUT controller comprising:
   a plurality of EOUT circuits;
   a fault selection circuit arranged to receive a fault signal which indicates a virtual electronic control circuit (vECU) has a fault and based on the fault signal, select an EOUT circuit from the plurality of EOUT circuits based on the received fault signal;
   wherein the selected EOUT circuit is arranged to based on not receiving the fault signal, generate a first EOUT signal which indicates the vECU of the SoC comprising a plurality of vECU is a first state; based on receiving the fault signal, generate a second EOUT signal which indicates the vECU is a second state, wherein the first EOUT signal is toggled at a first toggle frequency and the second EOUT signal is a toggled at a second toggle frequency or is a static signal; and output the first EOUT signal or second EOUT signal,
   wherein the EOUT circuit is further arranged to access a configuration register for a EOUT pin mode, based on the EOUT pin mode being a first value, the first EOUT signal is toggled at the first toggle frequency and the second EOUT signal is static and based on an EOUT mode indication being a second value, the first EOUT signal is toggled at the first toggle frequency and the second EOUT signal is toggled at the second toggle frequency.

10. The EOUT controller of claim 9, wherein the first EOUT signal and second EOUT signal is output to a power management integrated circuit (PMIC) or external device.

11. The EOUT controller of claim 9, wherein the configuration register indicates that the second toggle frequency is a scaled version of the first toggle frequency.

12. The EOUT controller of claim 9, wherein the indication of the fault is provided by the vECU.

13. The EOUT controller of claim 9, wherein the second EOUT signal indicates the vECU is in a safe state and the first EOUT signal indicates the vECU is in a normal state.

14. The EOUT controller of claim 9, wherein the indication of the fault signal is provided by the vECU and the toggle frequencies are defined by the configuration register corresponding to the vECU where different toggle frequencies are associated with different VECUS.

15. The EOUT controller of claim 9, further comprising the configuration register with an inverter field, wherein contents indicate whether to invert the first and second EOUT signal.

16. The EOUT controller of claim 9, further comprising the configuration register with an EOUT pin field, wherein the second EOUT signal is toggled at the second toggle frequency or is the static signal based on the EOUT pin field.

17. The EOUT controller of claim 9, further comprising the configuration register with a time switch mode count field, wherein the first toggle frequency or second toggle frequency is based on a time switch mode count of the time switch mode count field.

18. The EOUT controller of claim 9, further comprising an EOUT pin which is enabled to output the first EOUT signal based on a reset of the vECU or second EOUT signal.

* * * * *